3,337,403
STABLE AND PALATABLE PHARMACEUTICAL COMPOSITIONS
Margaret Rose Zentner, West Orange, N.J., assignor to Hoffmann-La Roche Inc., Nutley, N.J., a corporation of New Jersey
No Drawing. Filed Sept. 5, 1963, Ser. No. 306,692
4 Claims. (Cl. 167—55)

This invention relates, in general, to novel pharmaceutical compositions and to a process for making same. More particularly, the invention relates to pharmaceutically acceptable reaction products of the phosphate salt of the dl-tropic acid ester of 3-diethylamino-2,2-dimethyl-1-propanol and to the use of those reaction products in antacid preparations.

This application is a continuation-in-part of application Ser. No. 149,539, filed Nov. 2, 1961 now U.S. Patent No. 3,140,978.

The phosphate salt of the dl-tropic acid ester of 3-diethylamino - 2,2 - dimethyl - 1 - propanol is a known compound having pronounced antispasmodic activity. The foregoing notwithstanding, however, certain properties and characteristics of that salt leave very much to be desired. For example, the phosphate salt of the dl-tropic acid ester of 3 - diethylamino - 2,2 - dimethyl-1-propanol is a bitter tasting drug. This bitter taste is carried over into conventional oral dosage forms of this compound. For obvious reasons, this property tends greatly to decrease patient acceptance of this valuable drug.

Moreover, although the phosphate salt of the dl-tropic acid ester of 3 - diethylamino - 2,2 - dimethyl-1-propanol has, in the past, been used as an active drug component of antacid preparations, it has been found that this salt is quite unstable in compositions of this nature. Apparently, when embodied into such compositions, hydrolysis of the ester linkage takes place to form tropic acid and diethyl-dimethylamino-propanol. The hydrolysis products do not possess the antispasmodic properties of the original salt. The seriousness of this situation will be appreciated more easily when it is realized that, when the phosphate salt of the dl-tropic acid ester of 3-diethylamino-2,2-dimethyl-1-propanol is incorporated into a conventional antacid formulation, decomposition of such salt, in the order of magnitude of 50%, occurs in a period of about three months. Moreover, over a one year period, such an antacid formulation suffers a loss of about 75% of the salt of the 3-diethylamino-2,2-dimethyl-1-propanol which was originally present therein.

Thus, in its most comprehensive embodiment, the present invention is concerned with a novel reaction product of the phosphate salt of the dl-tropic acid ester of 3-diethylamino-2,2-dimethyl-1-propanol.

In another embodiment, the invention is concerned with a stable and palatable product which provides all of the therapeutic values of the phosphate salt dl-tropic acid ester of 3-diethylamino-2,2-dimethyl-1-propanol.

In a further embodiment, the invention is concerned with novel reaction products which, while stable and palatable, have the antispasmodic properties of the phosphte salt of the dl-tropic acid ester of 3-diethylamino-2,2-dimethyl-1-propanol, and with the use of such products, particularly as antispasmodic components of antacid preparations.

It has been found that compositions which are obtained by reacting the phosphate salt of the dl-tropic acid ester of 3-diethylamino - 2,2 - dimethyl-1-propanol with a complex magnesium aluminum silicate, the nature of which will be described more fully hereinafter, are stable, nonbitter tasting and physiologically active and, as such, suitable for use in the formulation of stable and palatable pharmaceutical preparations.

The novel compositions of this invention can be obtained quite readily. In one embodiment of the invention, the reaction is effected by mixing the complex magnesium aluminum silicate reactant with an aqueous solution containing the phosphate salt of the dl-tropic acid ester of 3-diethylamino-2,2-dimethyl-1-propanol. The desired reaction occurs, and the desired product is formed, when the mixture is stirred for a short period of time at room temperature or at a temperature elevated above room temperature. In an alternate method, the dry phosphate salt of the dl-tropic acid ester of 3-diethylamino-2,2-dimethyl-1-propanol is added to, and mixed with, the complex magnesium aluminum silicate compound. The desired reaction takes place when the mixture is wetted with a quantity of water sufficient at least to form a paste-like reaction mass. In either embodiment, after drying the reaction product, a tasteless, stable and therapeutically active product is obtained.

In carrying out the present invention, one may use, in general, any complex magnesium aluminum silicate compound. Preferably, there is employed a complex magnesium aluminum silicate compound of the type sold by the R. T. Vanderbilt Company, Inc., New York, New York, under the trade name "Veegum". The chemical analysis of Veegum, expressed as oxide, is as follows:

|  | Percent |
|---|---|
| Silicon dioxide | 61.1 |
| Magnesium oxide | 13.7 |
| Aluminum oxide | 9.3 |
| Titanium dioxide | 0.1 |
| Ferric oxide | 0.9 |
| Calcium oxide | 2.7 |
| Sodium oxide | 2.9 |
| Potassium oxide | 0.3 |
| Carbon dioxide | 1.8 |
| Water of combination | 7.2 |

In a more preferred embodiment of the invention, a complex magnesium aluminum silicate sold as neutral "Veegum" is employed. Neutral Veegum, like the regular grade of Veegum, is a standard item of commerce marketed by R. T. Vanderbilt Company, Inc. Neutral Veegum differs from the regular grade of Veegum in that its sodium content, expressed as sodium oxide, is about 1.0%. The regular grade of Veegum has a sodium content, expressed as sodium oxide, of about 2.9%. Moreover, in the form of a 5% by weight aqueous dispersion, neutral Veegum has a viscosity of about 100 centipoises (±50%) and a pH of about 7.5. A 5% by weight aqueous dispersion of the regular grade of Veegum has a viscosity of about 250 centipoises (±25%) and a pH of about 9.0. Finally, neutral Veegum has an acid demand of less than 1 cc. of N/10 hydrochloric acid per gram, whereas the acid demand of the regular grade of Veegum is about 6 to 8 cc. of N/10 hydrochloric acid per gram.

The regular grade of Veegum is marketed in the form of a powder. Neutral Veegum is marketed in the form of small white flakes. While particle size is not particularly critical to the operability of this invention, a complex magnesium aluminum silicate which has been reduced to a finely divided powder form is preferably used. Such a product can be obtained, for example, by passing neutral Veegum flakes through a microatomizer or through some similar device.

It should be fully understood that, while the present invention will be described with particular reference to the use of Veegum type products as the complex magnesium aluminum silicate reactant, the underlying principle of the invention is applicable equally to the use of other complex magnesium aluminum silicate compounds which are similar in nature and composition to Veegum type products.

The quantity of complex magnesium aluminum silicate and the quantity of the phosphate salt of the dl-tropic acid ester of 3-diethylamino-2,2-dimethyl-1-propanol which is used in carrying out this invention can be varied within rather wide limits. In general, there will be employed from about 6 parts by weight to about 12 parts by weight of the complex magnesium aluminum silicate compound for each part by weight of the phosphate salt of the dl-tropic acid ester of 3-diethylamino-2,2-dimethyl-1-propanol. In the preferred embodiment of the invention, however, there will be used from about 7 parts by weight to about 10 parts by weight of the complex magnesium aluminum silicate compound for each part by weight of the phosphate salt of dl-tropic acid ester of 3-diethylamino-2,2-dimethyl-1-propanol.

As has been indicated, heretofore, the reaction of the complex magnesium silicate with the phosphate salt of the dl-tropic acid ester of 3-diethylamino-2,2-dimethyl-1-propanol is carried out in the presence of water. The quantity of water which is used, however, can be varied within rather wide limits. Thus, for example, one can use a quantity of water which is sufficiently large to completely dissolve the salt of dl-tropic acid ester of 3-diethylamino-2,2-dimethyl-1-propanol. Moreover, a quantity of water in excess of that required to dissolve the acid addition salt can be employed. On the other hand, there can be used the minimum quantity of water needed to thoroughly wet the reactants. Regardless, however, of the precise quantity of water used in any particular embodiment of the invention, the desired reaction is effected by mixing the reactants, in the presence of water, at room temperature, or at a temperature up to about 90° C. When the reaction is completed, the reaction product is separated from water by any suitable means, following which the dry product is pulverized to desired particle size.

The precise nature of the products which are obtained by the reaction described in the preceding paragraphs has not as yet been established. It is known, however, that the products are not merely physical mixtures of the phosphate salt of the dl-tropic acid ester of 3-diethylamino-2,2-dimethyl-1-propanol. This conclusion is based upon the fact that considerable difficulty has been encountered in the laboratory in separating the active drug ingredient from the reaction product. As a result of this, many of the analytical methods which are normally used in assaying the drug cannot be used in assaying the products of this invention. Due to the nature of the product which is produced, it has been necessary to devise special procedures involving, for example, alkaline extraction techniques, to liberate the drug for assay. Moreover, the conclusion that a new product has been formed is based upon the fact that, in certain environments, the present products are far more stable than the phosphate salt starting material. The foregoing notwithstanding, however, pharmacological tests have demonstrated that the phosphate salt of the dl-tropic acid ester of 3-diethylamino-2,2-dimethyl-1-propanol is released from the reaction product under physiological conditions and that, when so liberated, it manifests full activity.

The products of this invention can be formulated into the various conventional oral dosage forms. For example, the novel products of this invention can be embodied into solutions, suspensions, or emulsions. Moreover, the products of this invention can be formulated into tablets or incorporated into soft or hard shell capsules. In producing these dosage forms, conventional procedures and techniques are employed and there can be used any of the adjuvants or excipients normally used in preparing such dosage forms. Thus, for example, in formulating the present products into oral dosage forms, one can use as adjuvants, suitable suspending agents, such as polyoxyethylene sorbitan fatty esters, polyoxyethylene esters of fatty acids, etc.; coloring agents; flavoring agents; sweetening agents, such as, sugar and artificial sweeteners; preservatives, such as, benzoic acid, methyl-p-hydroxybenzoate, propyl-p-hydroxybenzoate; sorbic acid, buffers, such as, lactic acid, citric acid; etc. Furthermore, in producing these compositions there can be used other conventional suspending agents and emulsifying agents as well as lubricants, disintegrants, etc.

As indicated heretofore, the present invention has particular significance in that it provides products which are stable, pharmacologically active and devoid of objectionable taste. The products have found to be especially well-suited for use as components in antacid compositions. The present products, in admixture with the conventional ingredients of antacid preparations, are far more stable than the phosphate salt of the dl-tropic acid ester of 3-diethylamino-2,2-dimethyl-1-propanol which is unreacted with acomplex magnesium aluminum silicate. It has been found, for example, that little or no decomposition of the phosphate salt of the dl-tropic acid ester of 3-diethylamino-2,2-dimethyl-1-propanol occurs when tablets, containing the products of this invention, are stored at ordinary atmospheric conditions for a period of over 21 months. Moreover, the present products, and the various oral dosage forms thereof, are noteworthy in that they are completely devoid of the bitter taste which normally characterizes both the phosphate salt of the dl-tropic acid ester of 3-diethylamino-2,2-dimethyl-1-propanol itself and oral dosage forms containing this compound.

For a fuller understanding of the nature and objects of this invention, reference may be had to the following examples which are given merely as further illustrations of the invention and are not to be construed in a limiting sense. All parts given in the examples are parts by weight, unless otherwise indicated.

*Example 1*

In this example, 89.9 grams of neutral Veegum were added, with stirring, to a solution comprising 10.1 grams of the phosphate salt of dl-tropic acid ester of 3-diethylamino-2,2-dimethyl-1-propanol dissolved in 400 cc. of distilled water. The mixture was stirred at room temperature for a period of about two and one-half hours. Thereafter, the reaction mixture was allowed to stand overnight at room temperature, following which the mixture was filtered. The filter cake was then washed with fresh water, subsequently dried to constant weight at a temperature of 45° C. and, finally, pulverized. A stable and therapeutically active product, which was devoid of objectionable taste, was obtained.

*Example 2*

In this example, there was mixed intimately 10.1 grams of the phosphate salt of dl-tropic acid ester of 3-diethylamino-2,2-dimethyl-1-propanol with 89.9 grams of neutral Veegum. Subsequently, there was added to this mixture 60 cc. of water. The wetted reaction mass was stirred for a short time at room temperature, following which the mass was dried at a temperature of 45° C. to constant weight.

A stable and therapeutically active product, which was devoid of bitter taste, was thus obtained.

*Example 3*

In this example, a product was produced by the procedure which was employed in preparing the product of Example 2. In this example, however, the reaction was effected between 257 grams of neutral Veegum and 43 grams of the phosphate salt of dl-tropic acid ester of 3-diethylamino-2,2-dimethyl-1-propanol.

The product which was thus obtained was stable, tasteless and therapeutically active.

Example 4

The product of Example 3 was used in the formulation of antacid tablets. In formulating these tablets, there was used, per tablet, 35 mg. of the product of Example 3 (such quantity being equivalent to 5.01 mg. of the phosphate salt of the dl-tropic acid ester of 3-diethylamino-2,2-dimethyl-1-propanol itself), 288 mg. of aluminum hydroxide, 142 mg. of calcium carbonate, 17.2 mg. of magnesium peroxide and 34.4 mg. of magnesium oxide. Excipients and flavors were added as needed. Tableting was effected by conventional procedures.

The tablets were allowed to stand, exposed at room temperature for a period of twenty-one months. At the end of that period of time, assay of the tablets established that little or no decomposition of the phosphate salt of the dl-tropic acid ester of 3-diethylamino-2,2-dimethyl-1-propanol had occurred during storage.

I claim:

1. A stable and palatable pharmaceutical product produced by mixing, in the presence of water, a complex magnesium aluminum silicate with the phosphate salt of the dl-tropic acid ester of 3-diethylamino-2,2-dimethyl-1-propanol.

2. A stable and platable pharmaceutical product produced by mixing a complex magnesium aluminum silicate with an aqueous solution of the phosphate salt of the dl-tropic acid ester of 3-diethylamino-2,2-dimethyl-1-propanol.

3. A stable and palatable pharmaceutical preparation, in oral dosage form, comprising (a) medicinally acceptable adjuvant materials and (b) a product produced by mixing, in the presence of water, a complex magnesium aluminum silicate with the phosphate salt of the dl-tropic acid ester of 3-diethylamino-2,2-dimethyl-1-propanol.

4. A stable and palatable pharmaceutical preparation comprising medicinally acceptable adjuvant material in admixture with aluminum hydroxide, calcium carbonate, magnesium peroxide, magnesium oxide and a product producing by mixing, in the presence of water, a complex magnesium aluminum silicate with the phosphate salt of the dl-tropic acid ester of 3-diethylamino-2,2-dimethyl-1-propanol.

References Cited

UNITED STATES PATENTS

| 3,140,978 | 7/1964 | Zentner | 167—55 |
| 3,248,290 | 4/1966 | Zentner | 167—55 |

OTHER REFERENCES

Merck Index, Seventh Edition, 1960, page 73.

SAM ROSEN, *Primary Examiner.*